US012738684B2

(12) United States Patent
Moraga Fernandez et al.

(10) Patent No.: US 12,738,684 B2
(45) Date of Patent: Sep. 15, 2026

(54) FASTENER FREE BACKSHELL ASSEMBLY

(71) Applicant: Positronic Industries, Inc., Springfield, MO (US)

(72) Inventors: Inés Moraga Fernandez, Toulouse (FR); Stéphane Leprat, Leboulin (FR); Patrice Pivetta, Sainte Christie (FR); Stéphane De Monicault, Pavie (FR)

(73) Assignee: Positronic Industries, Inc., Springfield, MO (US)

( * ) Notice: Subject to any disclaimer, the term of this patent is extended or adjusted under 35 U.S.C. 154(b) by 32 days.

(21) Appl. No.: 18/766,218

(22) Filed: Jul. 8, 2024

(65) Prior Publication Data

US 2026/0005462 A1 Jan. 1, 2026

(30) Foreign Application Priority Data

Jun. 28, 2024 (EP) .................................... 24185506

(51) Int. Cl.
*H01R 13/502* (2006.01)

(52) U.S. Cl.
CPC .................................. *H01R 13/502* (2013.01)

(58) Field of Classification Search
CPC .................................................... H01R 13/502
See application file for complete search history.

(56) References Cited

U.S. PATENT DOCUMENTS 4,613,198 A 9/1986 Selvin et al.
7,059,892 B1 6/2006 Trout
10,008,812 B1 * 6/2018 Hamner ............. H01R 13/6585
11,527,850 B1 12/2022 Wright et al.
2017/0093076 A1 * 3/2017 Yokoyama ............... H01R 4/02
2021/0143564 A1 * 5/2021 Smith .................. H01R 13/405
2022/0149566 A1 5/2022 Mostoller et al.
2022/0255305 A1 * 8/2022 Pai ....................... H01R 13/743
2022/0271469 A1 * 8/2022 Moreau .................. B23K 20/12

FOREIGN PATENT DOCUMENTS

| | | | |
|---|---|---|---|
| CN | 109586094 | A | 4/2019 |
| DE | 2401377 | A1 | 7/1974 |
| EP | 0059566 | B1 | 11/1984 |
| EP | 1361629 | A2 | 11/2003 |
| EP | 2323228 | B1 | 9/2013 |
| EP | 3754790 | A1 | 1/2022 |
| WO | 2024017778 | A1 | 1/2024 |

OTHER PUBLICATIONS

European Search Report, European Patent Application No. EP24185506, Dec. 4, 2024, 3 pages.

* cited by examiner

*Primary Examiner* — Hung V Ngo
(74) *Attorney, Agent, or Firm* — Stinson LLP

(57) ABSTRACT

A backshell for an electrical connector and an electrical connector assembly including the connector and the backshell. The backshell is formed from several components that can be slid together to hold the electrical connector and contain portions of wires that are terminated in the electrical connector. A method of making such a connector is also disclosed.

17 Claims, 14 Drawing Sheets

FASTENER FREE BACKSHELL ASSEMBLY

FIELD OF THE INVENTION

The present invention generally relates to a backshell used with a connector to manage wires connected to the connector.

BACKGROUND

Networked electronic systems include many components that communicate with each other through wires in electrical cables. The cables are often terminated in a connector having multiple contacts. The cable jacket is removed near the end being terminated in the connector. Each wire is connected to a respective one of the contacts. The wire insulation is removed from the wires being terminated in the connector for purposes of making the connection with the contacts.

A backshell is often used with the electrical connector to manage with wires to prevent moisture, debris (e.g., dust particles) from entering the connector. In some instances, the backshells will be required to withstand difficult environments. The backshell can also be used to provide strain relief for the cable and wires therein.

It is common for the backshells to be formed in several pieces that are secure together in the final assembly. Screws are often used to close and secure the backshell components together. It is important for the screws to be tight, but the amount of torque applied by the screws cannot be too great. As a result, tightening of the screws must be carefully controlled. The use of screws also requires additional inspection time for the final assembly. Other backshells are constructed so that they must be applied prior to the connection of the cable wires to the electrical connector contacts. Still other backshells can be used with only one or a very narrow range of electrical connectors.

SUMMARY

In one aspect, an electrical connector assembly generally comprising a connector body containing a plurality of contacts. A cable includes a plurality of wires that are terminated to respective ones of the contacts. A backshell comprises a plurality of components. The components are constructed for assembly around the connector body and the cable wires by a sliding interconnection of the components with each other.

In another aspect, a backshell for an electrical connector that terminates multiple wires to multiple contacts. The backshell generally comprises a plurality of components. The components are constructed for assembly around the connector body and the cable wires by a sliding interconnection of the components with each other.

In a further aspect, a method of making an electrical connector assembly generally comprises a step of placing an electrical connector and a plurality of wires terminated in the electrical connector onto a receptacle of a backshell. A closure panel is slid onto the receptacle such that portions of the closure panel are received in grooves on the receptacle and the closure panel closes an open top of the receptacle. A joining piece is slid onto the receptacle and the closure panel such that the joining piece captures the receptacle and closure panel for holding the joining piece, receptacle and closure panel together in assembly on the electrical connector and wires. Portions of the wires are contained in an interior space defined by the receptacle and closure panel.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
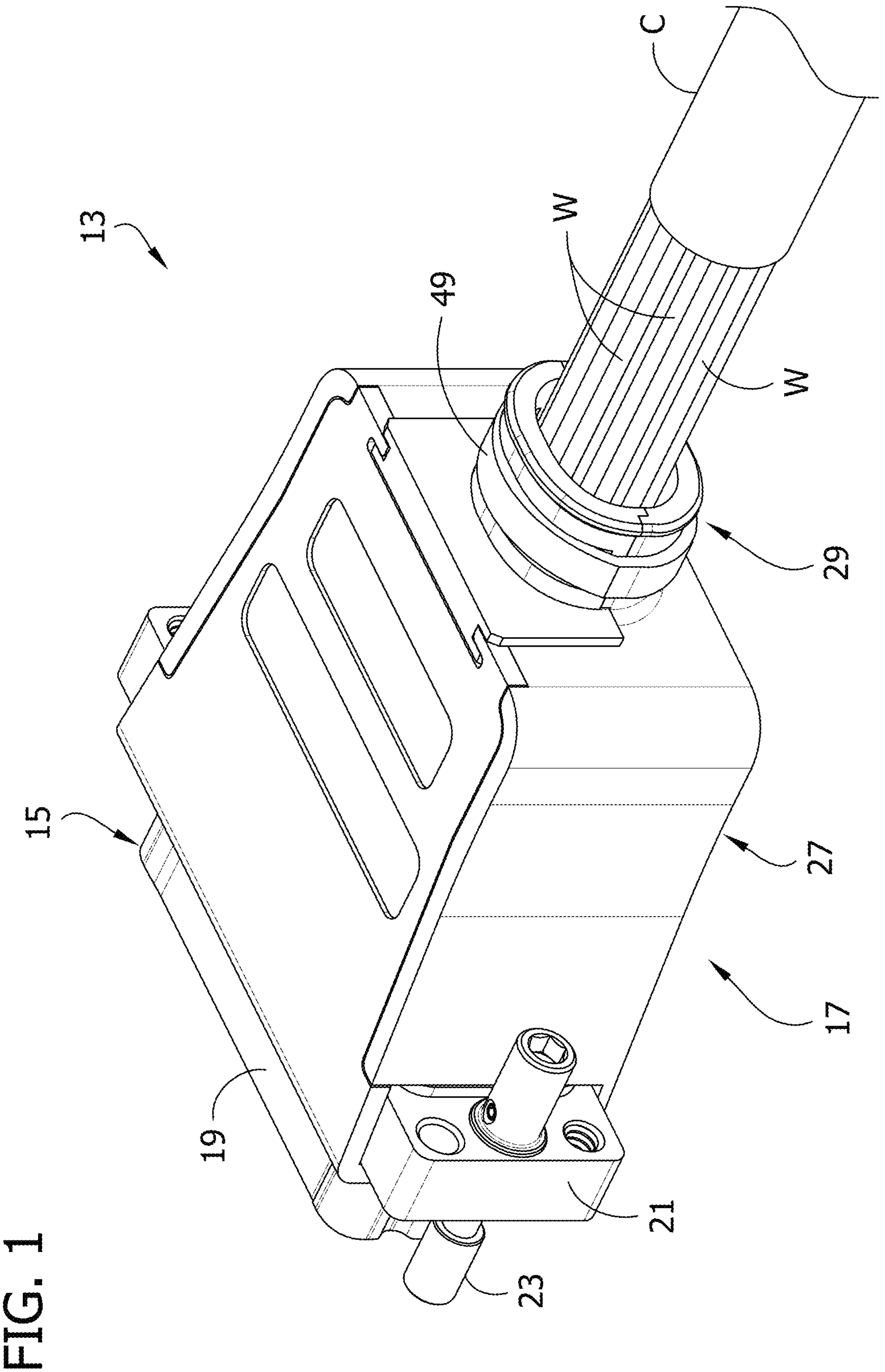
FIG. 1 is a rear perspective of a backshell attached to a connector.

Referring to the drawings and in particular to FIG. 1, a connector assembly is indicated generally at 13. The connector assembly comprises an electrical connector 15 and backshell 17. The connector 15 includes an electrically insulating connector body 19 containing electrical conductors (e.g., contacts), not shown. The contacts are constructed for making electrical connection with a device or another connector as is known in the art. A cable C contains multiple wires W that are terminated in the electrical connector 15. The backshell 17 receives the wires W and provides a space for the wires in its interior. The contacts to which the wires are connected may be male, female or a combination of the two. Other configurations of conductors can be used without departing from the scope of the present invention. Moreover, the connector 15 may take on other forms, including as a fiber optic connector. The connector 15 is received in and held by the backshell 17 so that the connector and backshell operate as a single part. Flanges 21 of the connector 15 mount fasteners 23 for connection to a device or other connector in a known manner.

Referring now to FIGS. 2-8, the backshell is shown to include a body 27 and a back post 29 connected to the body. The back post 29 is tubular and communicates with an open interior space 31 in the body 27. The wires W pass through the tubular back post 29 and into the open interior space 31 to the electrical connector 15. The body 27 and back post 29 are preferably formed with multiple components that fit together to capture the connector 15 and wires W. In the illustrated embodiment, the body 27 and back post 29 include a receptacle 33, a closure panel 35 and a first post member 37 (see, FIG. 8). The components may include different parts of the backshell 17 and/or body 27. As described more fully below, these components can be readily slid together to form the backshell 17 without the use of screws.

Figure 9:
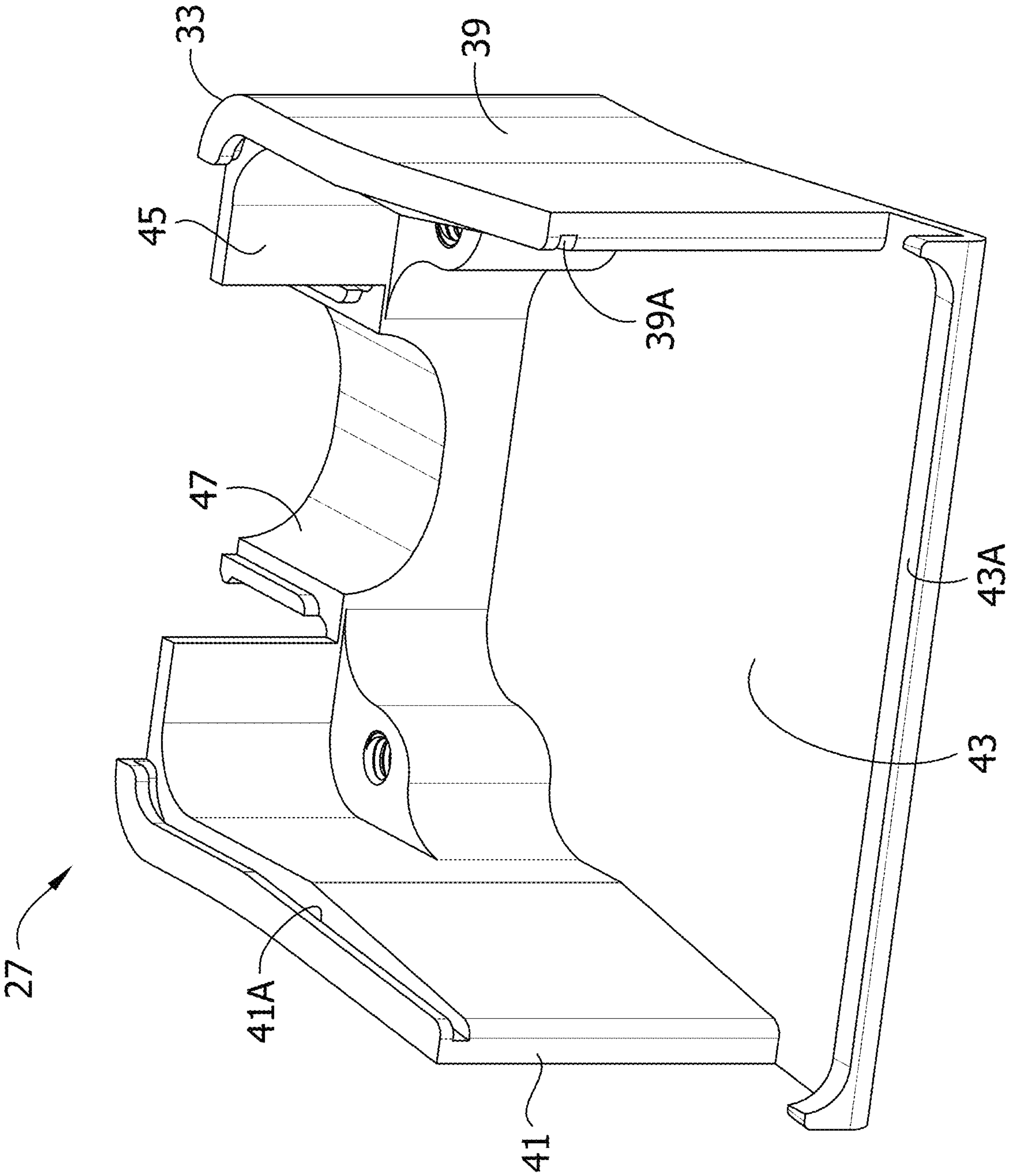
FIG. 9 is a perspective of the receptacle of the backshell.
Figure 10:
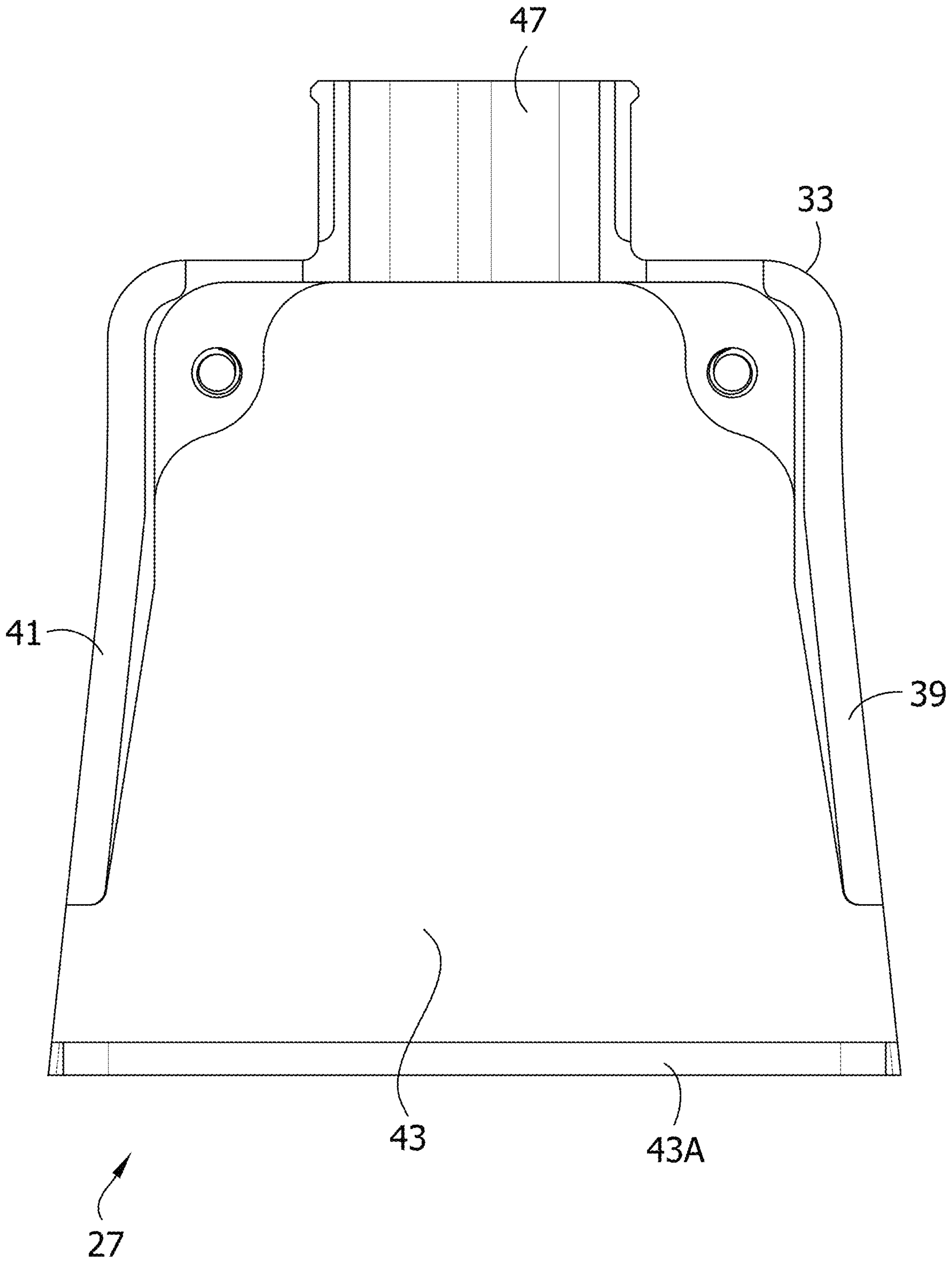
FIG. 10 is a top view of the receptacle.
Figure 11:
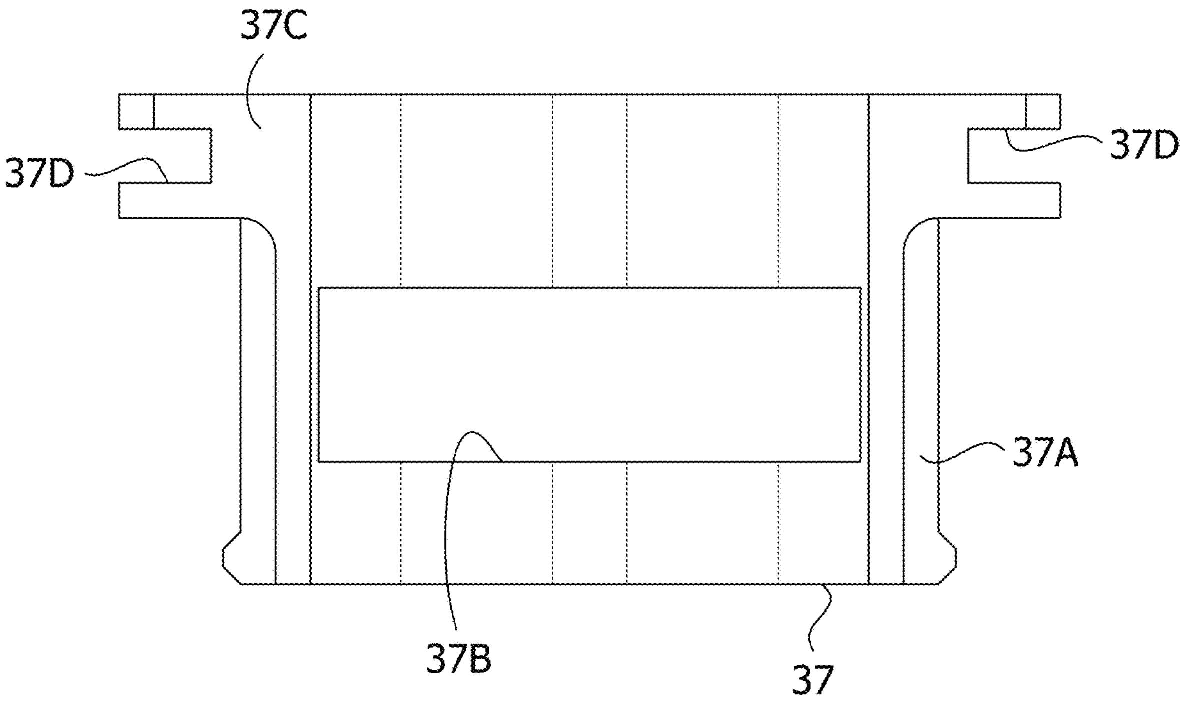
FIG. 11 is an enlarged, bottom view of the back post member of the backshell.

The receptacle 33 includes a pair of opposing side walls 39, 41 projecting upwardly from a floor 43. See, FIGS. 9 and 10. A back wall 45 projecting up from the floor 43 extends between and connects the side walls 39, 41. The floor 43 projects forward of the forward ends of the side walls 39, 41 and terminates in an upwardly turned lip 43A. The lip has opposite ends that project upward more than the remainder of the lip 43A. Each of the side walls 39, 41 has a groove 39A, 41A extending into the respective side wall near the top of the side wall. The length of each groove is generally the same as the length of the respective side wall 39, 41. A second post member 47 extends rearwardly from the back wall 45.

Figure 2:
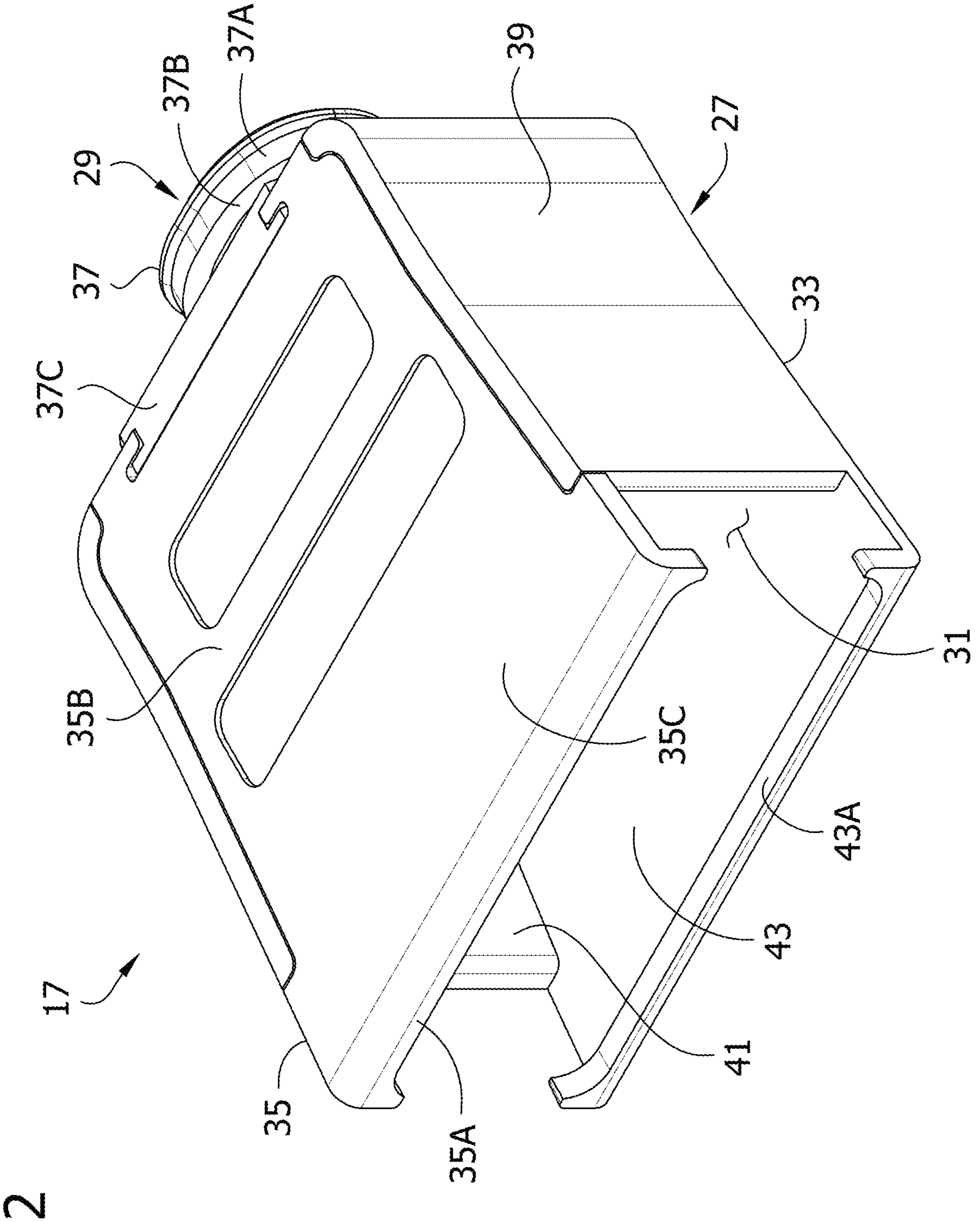
FIG. 2 is a front perspective of the backshell
Figure 3:
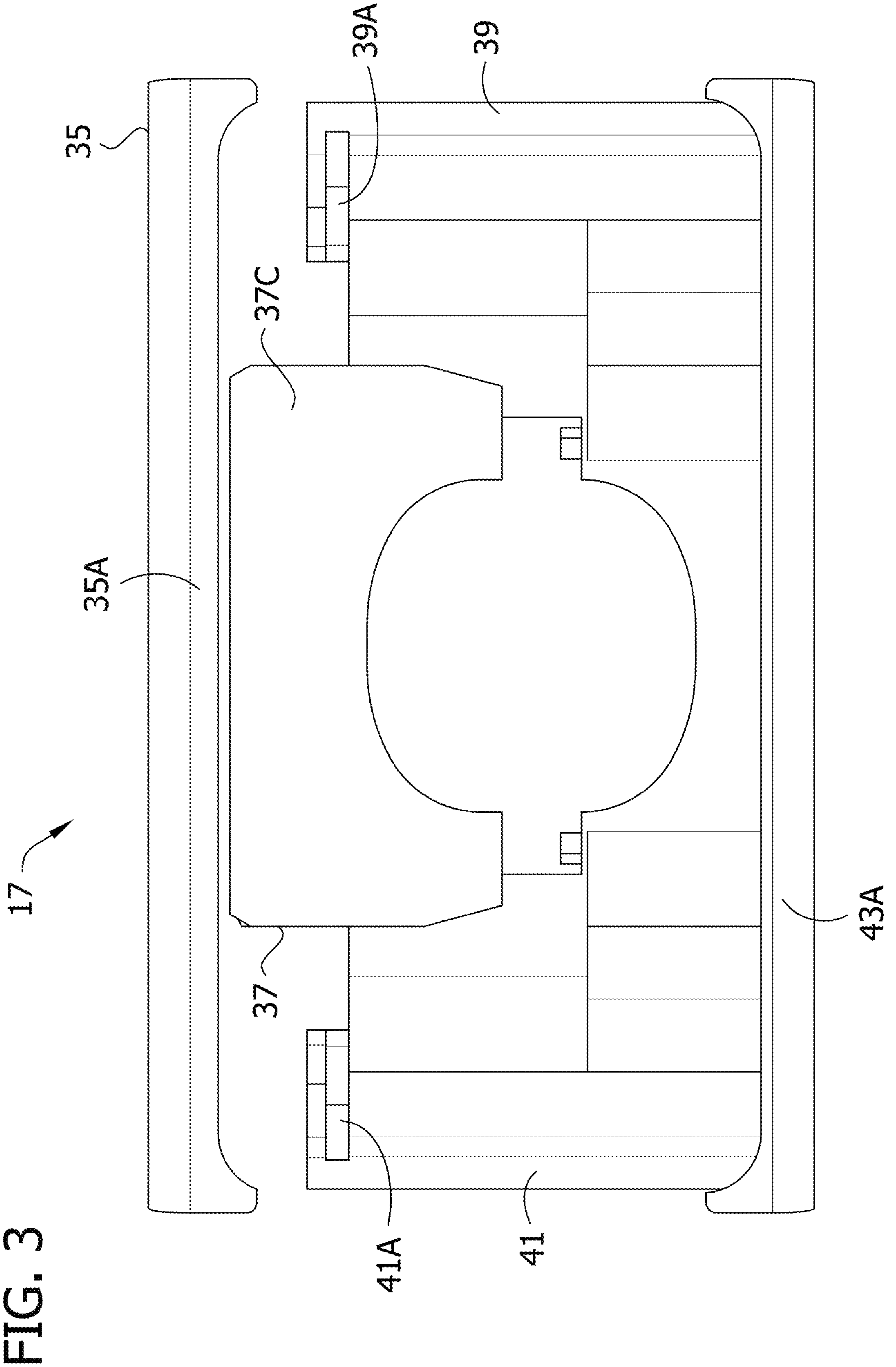
FIG. 3 is a front view of the backshell with a closure panel and back post member exploded from a receptacle of the backshell.
Figure 4:
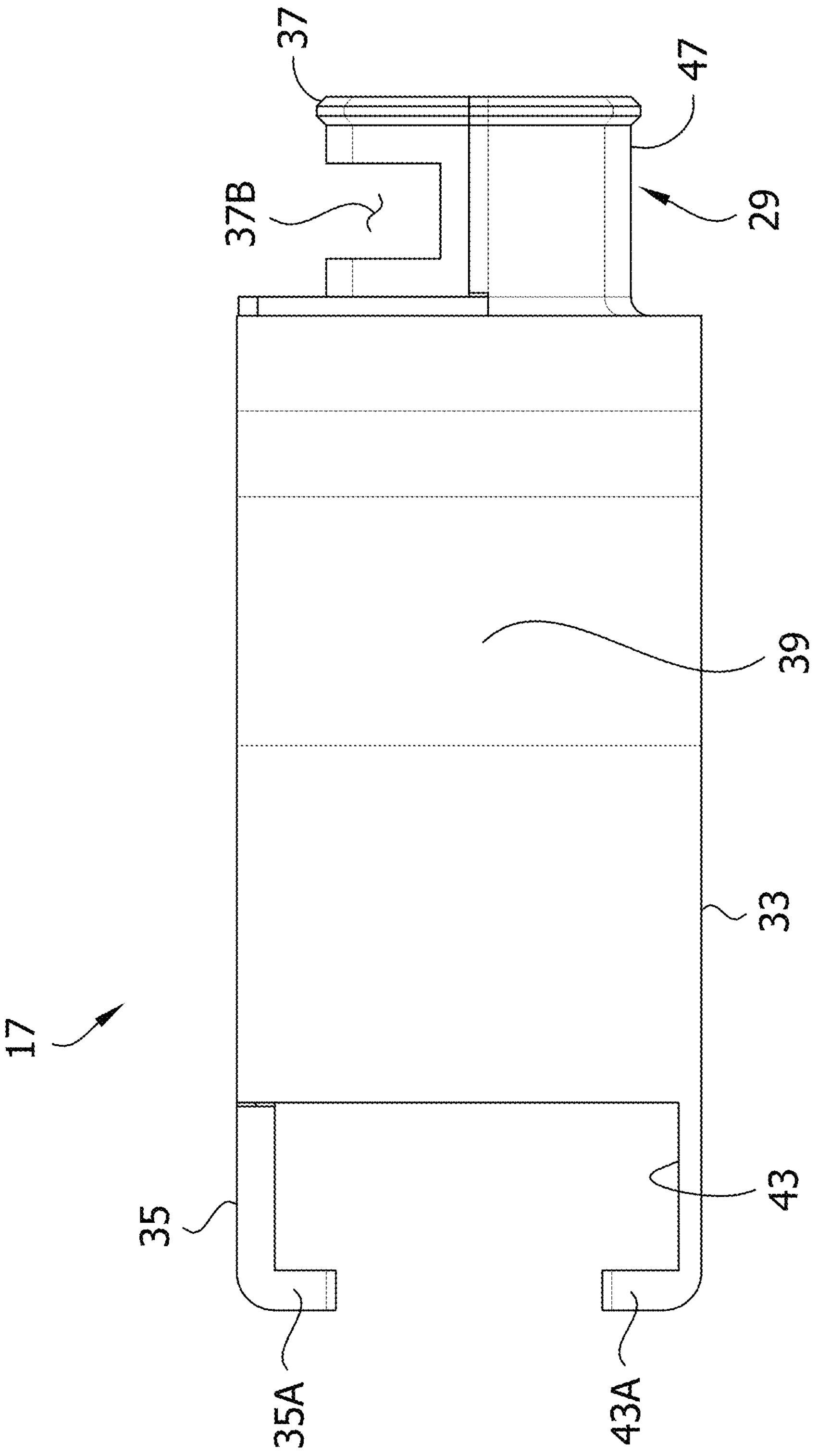
FIG. 4 is a side view of the backshell of FIG. 2.
Figure 5:
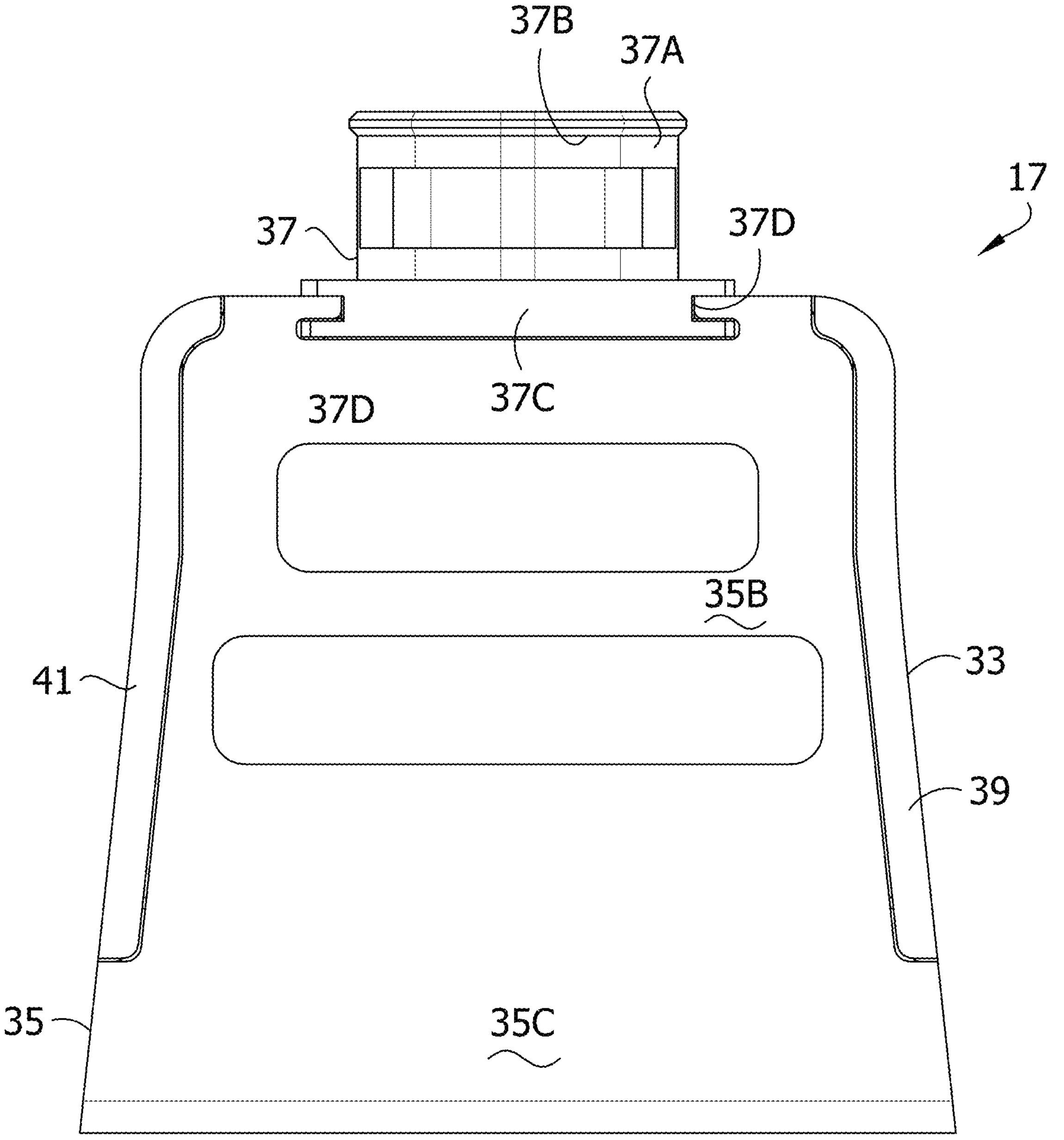
FIG. 5 is a top view of the backshell.
Figure 6:
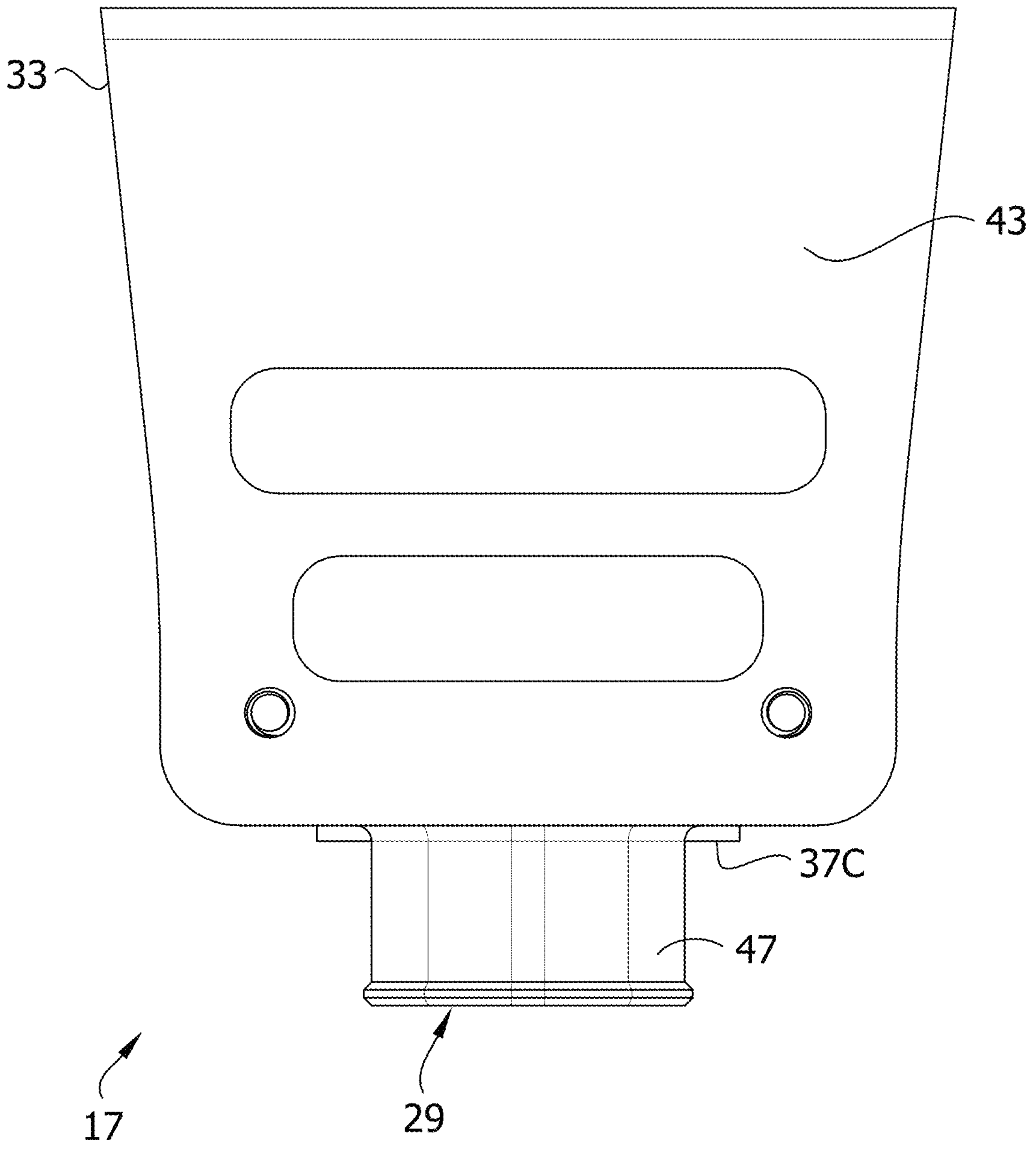
FIG. 6 is a bottom view of the backshell.
Figure 7:
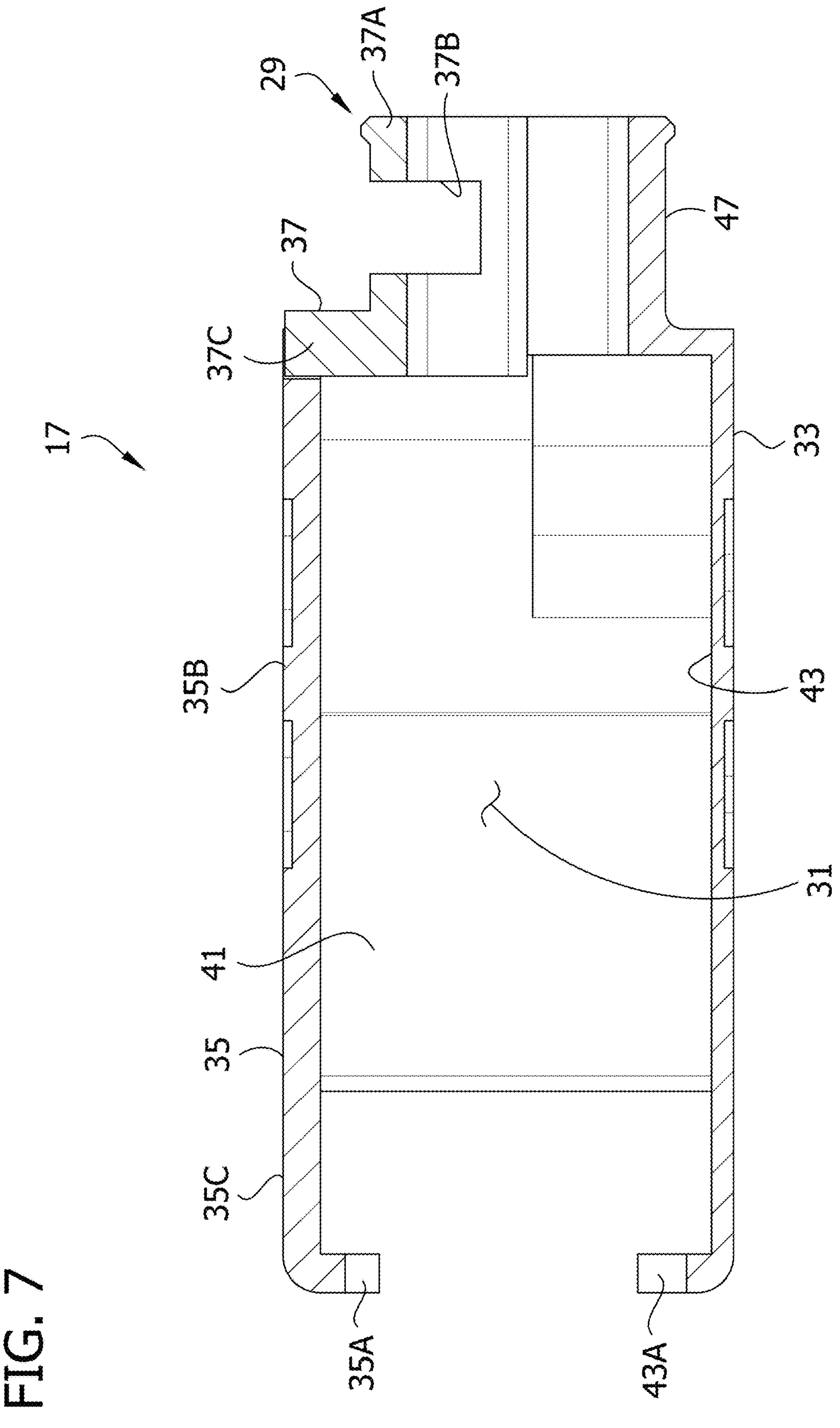
FIG. 7 is a longitudinal section through the backshell.
Figure 8:
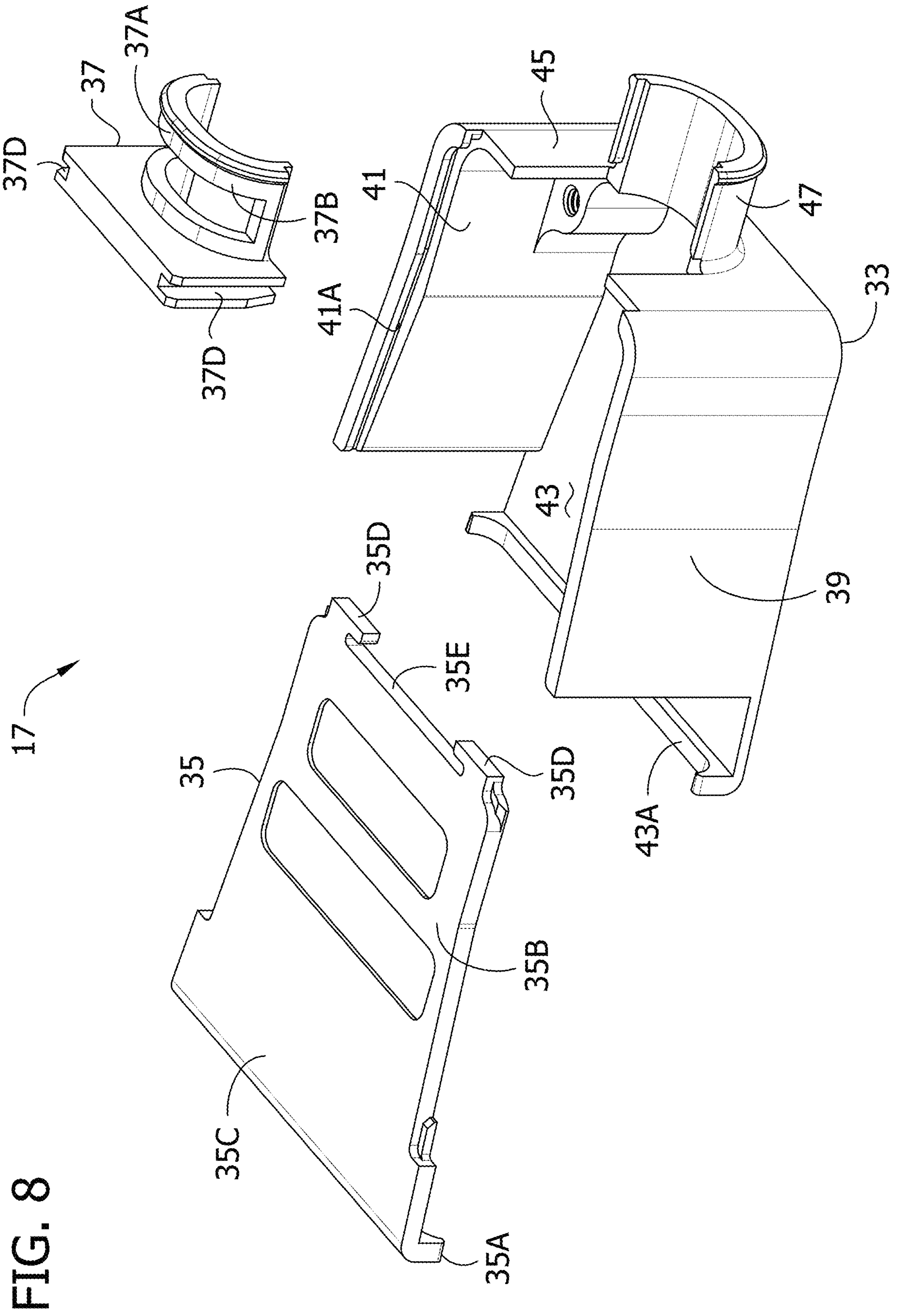
FIG. 8 is an exploded perspective of the backshell.

As may be seen in FIGS. 2, 3 and 8, the closure panel 35 is sized and shaped to close the open top of the receptacle 33, and to project forward from the front ends of the side walls 39, 41 of the receptacle 33. One end of the closure panel has a downwardly extending lip 35A. The ends of the lip 35A protrude downward from the remainder of the lip, similar to the configuration of the lip 43A of the floor 43 of the receptacle 33. The lips 43A, 35A facilitate retention of the electrical connector 15 in the receptacle 33, as described more fully hereinafter. The closure panel 35 further includes a rear portion 35B and a front portion 35C. The rear portion 35B is narrower than the front portion 35C and opposite edge margins of the rear portion can be received in respective ones of the grooves 39A, 41A of the receptacle 33. The wider front portion 35C abuts the front ends of the side walls 39, 41 when the rear portion 35B is fully received by the receptacle 33. The rear edge margin of the rear portion 35B of the closure panel 35 is formed with a pair of opposing hooks 35D located at opposite ends of a slot 35E of the closure panel.

The final part of the receptacle 33 of the backshell 17 of the illustrated embodiment is the first post member 37. The first back post member includes a generally semi-cylindrical portion 37A that has a circumferentially extending window 37B. The semi-cylindrical portion 37A is formed as one piece with a mounting tab 37C (broadly, "a joining piece"). The mounting tab has channels 37D on opposite ends that can receive respective portions of the back wall 45 to connect the first back post member 37 to the receptacle 33. As connected to the receptacle, the first back post member 37 and the second back post member 47 come together to form a substantially complete cylinder or tube. For purposes of the present application, the receptacle 33, the closure panel 35 and the second back post member 47 are considered as "components" of the backshell 17.

Figure 12:
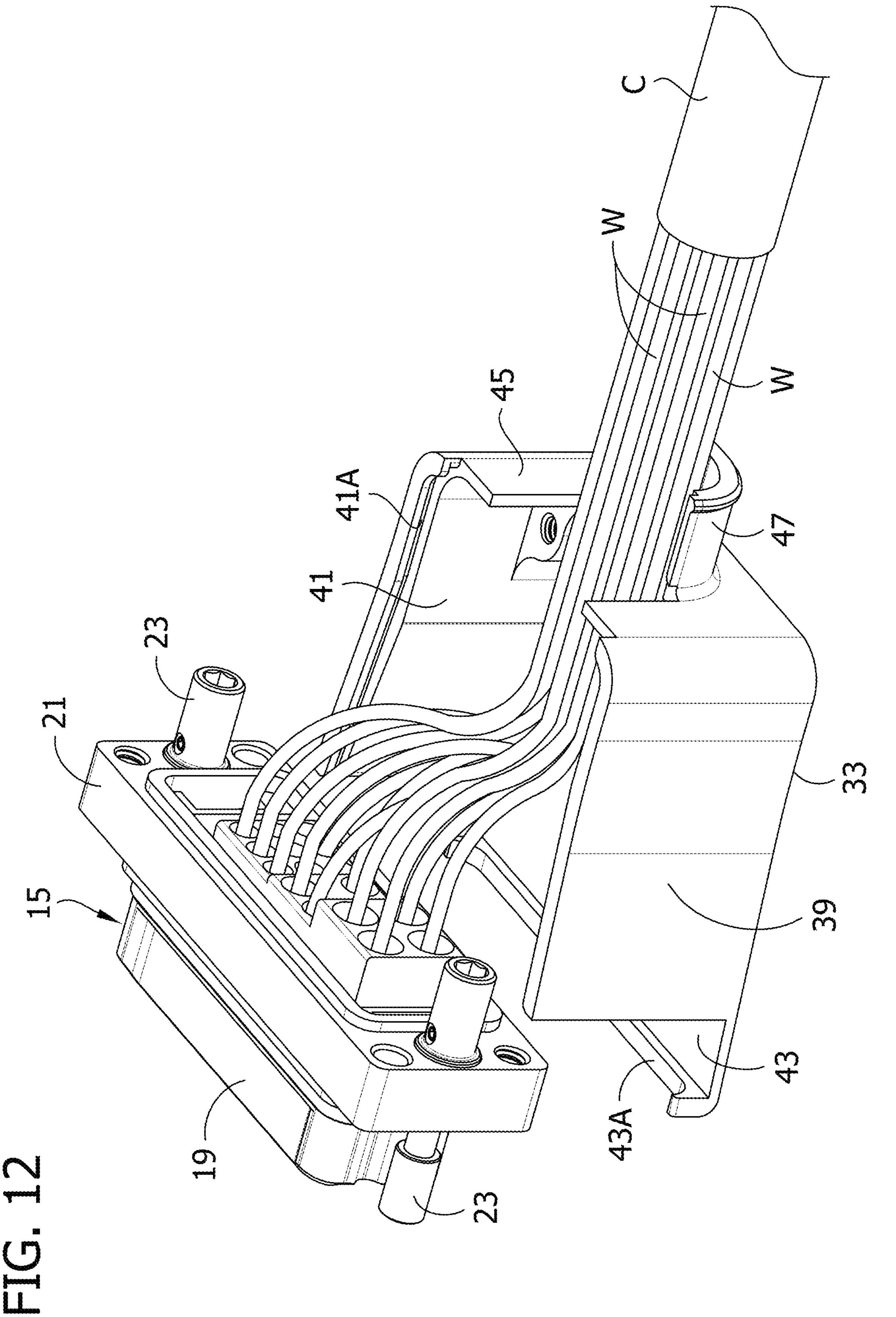
FIG. 12 is a perspective of a portion of the backshell and connector showing an initial assembly step.

Having described the construction of the backshell 17, the assembly of the backshell with the electrical connector 15 to form the connector assembly 13 will now be described. As shown in FIG. 12, the electrical connector 15, with the wires W already terminated in the connector can be moved down onto the front portion of the floor 43 of the receptacle 33. The flange 21 of the connector body 19 is sized and shaped so that it is received between the lip 43A of the floor and the front ends of the side walls 39, 41 of the receptacle 33. The wires W are laid in the receptacle 33 and cradled in the second back post member 47.

Figure 13:
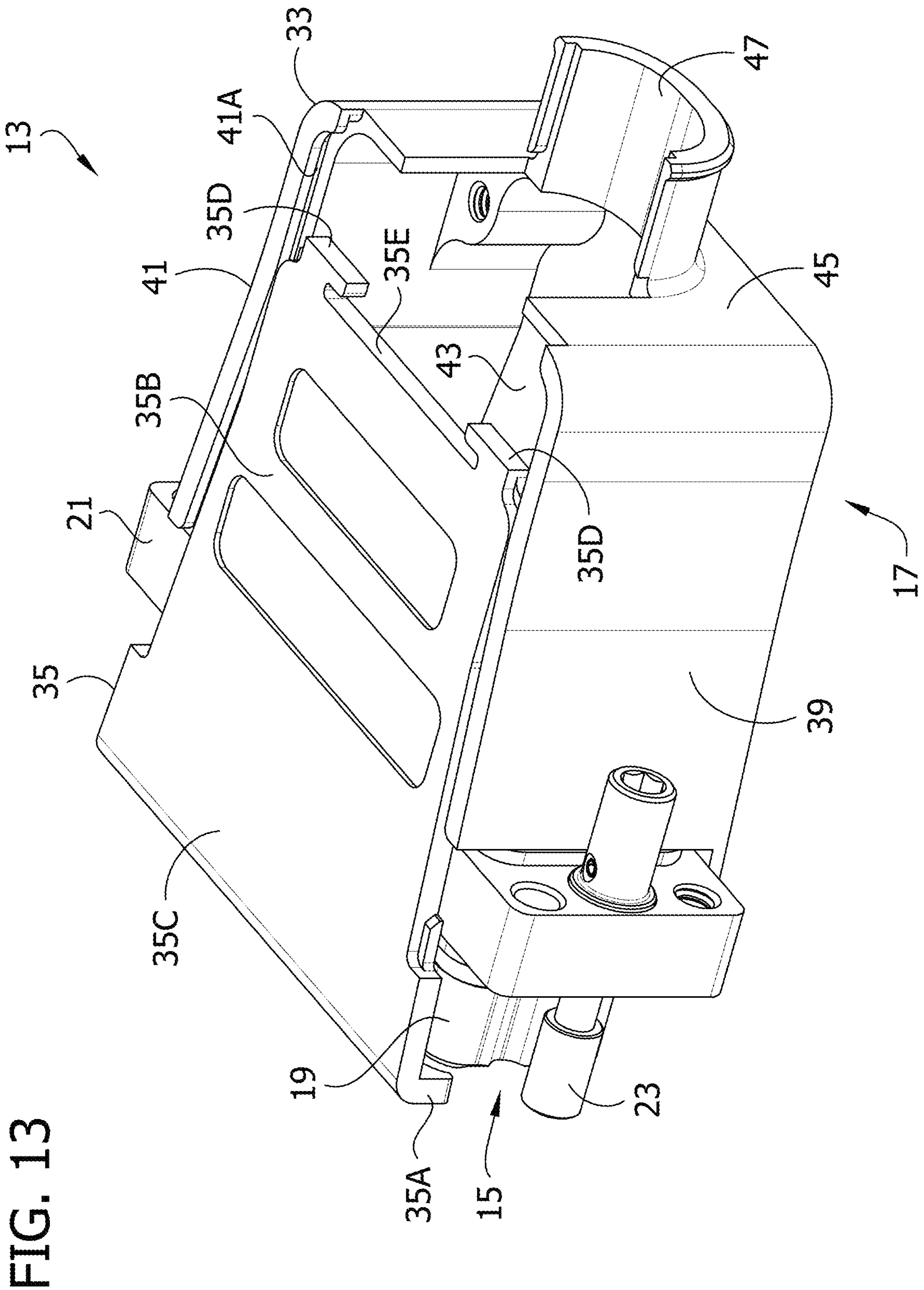
FIG. 13 is the perspective of FIG. 12 but showing a second assembly step.

Once the electrical connector 15 is seated in the receptacle 33, the closure panel 35 can be applied. This can be done by positioning the closure panel 35 in a horizontal orientation just forward of the receptacle 33, and moving the closure panel rearwardly with respect to the receptacle. The opposite edge margins of the closure panel 35 are received in respective ones of the grooves 39A, 41A of the receptacle 33, thereby connecting the closure panel to the receptacle. FIG. 13 shows the closure panel 35 part-way slid onto the receptacle. The ends of the grooves 39A, 41A are closed so that the closure panel will hit the bottom of the grooves when fully installed. In the final installed position of the closure panel 35, the hooks 35D are in registration with an upper edge of the back wall 45 of the receptacle.

Figure 14:
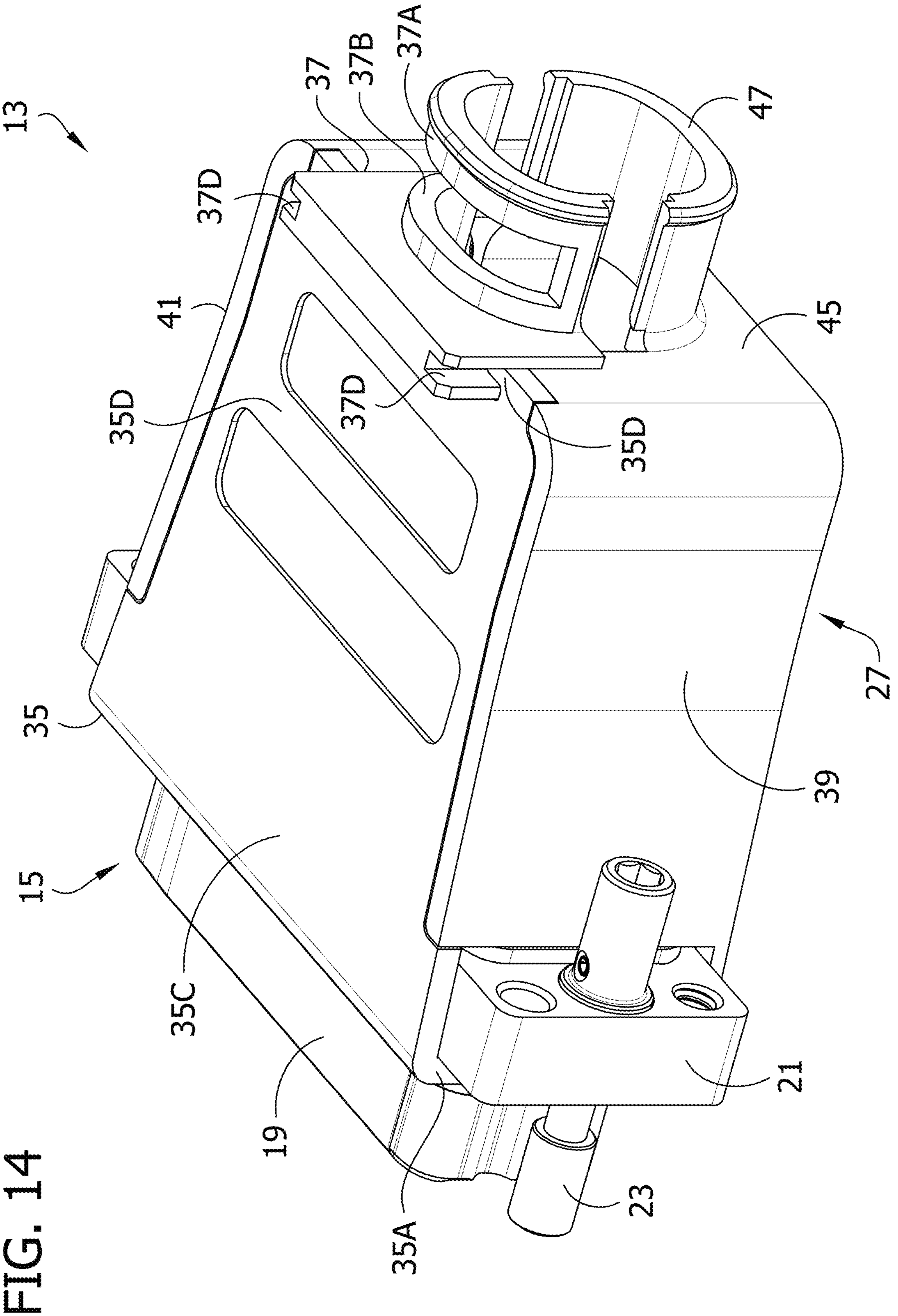
FIG. 14 is the perspective of FIG. 12 showing a still further assembly step, but with wires and the cable of FIG. 12 removed.

The first back post member 37 can now be attached to the assembled receptacle 33 and closure member 35. From a position generally above the receptacle back wall 45 (FIG. 8), the first back post member 37 is moved downward (see, FIG. 14). The tips of the hooks 35D of the closure panel 34 and portions of the back wall 45 are received in the channels 37D of the mounting tab 37C. The forward half of the mounting tab 37C is received through the slot 35E of the closure panel and down into the interior space 31 of the receptacle 33. The rearward half of the mounting tab 37C is positioned on the rearward side of the back wall 45. In this way, the mounting tab 37C captures the closure panel 35 and the back wall 45 of the receptacle to fix all three components making up the backshell 17 together.

As noted previously, the semi-cylindrical portion 37A of the first back post member 37 engages the second back post member 47 to form a tube through which the wires W pass into the backshell 17. A tie 49 (see, FIG. 1) is applied around the semi-cylindrical portion 37A and the second back post member 47 to securely join them together. This prevents the first back post member 37 from backing off of its connection with the receptacle 33 and the closure panel 35. No screw or bolt fasteners are required to complete this assembly. The cable C can be attached to the first and second back poste members 37, 47 to provide strain relief for the wires W. The connector assembly 13 is now ready to be used.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. An electrical connector assembly comprising:

a connector body containing a plurality of contacts;

a cable including a plurality of wires, the wires being terminated to respective ones of the contacts;

a backshell comprising at least three components, the components being constructed for assembly around the connector body and the cable wires by a sliding interconnection of the components with each other, one of the at least three components having a channel that receives portions of two of the other components to connect the at least three components together around the connector body.

2. The electrical connector assembly as set forth in claim 1 wherein interconnection of the backshell components is made free of threaded fasteners.

3. The electrical connector assembly as set forth in claim 1 wherein the components comprise a receptacle defining a space that receives the wires of the cable.

4. The electrical connector assembly as set forth in claim 3 wherein the receptacle has an open top receiving the wires into the receptacle.

5. The electrical connector assembly as set forth in claim 4 wherein the components further comprise a closure panel constructed for sliding engagement with the receptacle for connection to the receptacle in a position closing the open top of the receptacle.

6. The electrical connector assembly as set forth in claim 5 wherein the components further comprise a joining piece constructed to capture the receptacle and the closure panel in sliding engagement for connecting the receptacle, closure panel and joining piece together.

7. The electrical connector assembly as set forth in claim 6 further comprising a tie connecting the joining piece to one of the other components.

8. A backshell for use with an electrical connector that terminates multiple cable wires to multiple contacts in a connector body, the electrical connector including a connector body and cable wires the backshell comprising a first backshell component, a second backshell component and a third backshell component, the first, second and third backshell components being constructed for assembly around the connector body and the cable wires by a sliding interconnection of the components with each other, the second backshell component being slidable in a first direction along the first backshell component to form a first connection with the first backshell component that is elongate in the first direction, the third backshell component being slidable in a second direction along the first backshell component to form a second connection with the first backshell component that is elongate in the second direction, wherein the second direction is different than the first direction.

9. The backshell as set forth in claim 8 wherein interconnection of the first, second and third backshell components is made free of threaded fasteners.

10. The backshell as set forth in claim 8 wherein at least some of the first, second and third backshell components are formed with channels or grooves to receive portions of other backshell components for the sliding interconnection.

11. The backshell as set forth in claim 8 wherein one of the first, second and third backshell components is constructed to capture the other two backshell components for connecting the first, second and third backshell components together.

12. The backshell as set forth in claim 8 wherein the first backshell component comprises a receptacle defining a space that receives the wires of the cable.

13. The backshell as set forth in claim 12 wherein the receptacle has an open top receiving the wires into the receptacle.

14. The backshell as set forth in claim 13 wherein the second backshell component comprises a closure panel constructed for sliding engagement with the receptacle for connection to the receptacle in a position closing the open top of the receptacle.

15. The backshell as set forth in claim 14 wherein the third backshell component comprises a joining piece constructed to capture the receptacle and the closure panel in sliding engagement for connecting the receptacle, closure panel and joining piece together.

16. The backshell as set forth in claim 15 further comprising a tie connecting the joining piece to one of the first and second backshell components.

17. The backshell as set forth in claim 8 wherein the first backshell component comprises spaced apart side walls extending in the first direction from a front of the backshell to a rear of the backshell, the first backshell component further including a rear wall extending between the side walls, the second connection extending in the second direction being disposed in the rear wall.

* * * * *